United States Patent
Navarro (10) Patent No.: US 6,312,741 B1
(45) Date of Patent: Nov. 6, 2001

(54) ENCAPSULATED FOOD ACIDS FOR PRESERVATION OF BAKED GOODS

(75) Inventor: Luis Navarro, Manhattan, KS (US)

(73) Assignee: Balchem Corporation, Slate Hill, NY (US)

( * ) Notice: Subject to any disclaimer, the term of this patent is extended or adjusted under 35 U.S.C. 154(b) by 0 days.

(21) Appl. No.: 09/510,929

(22) Filed: Feb. 22, 2000

(51) Int. Cl.⁷ .................................................... A23L 3/00
(52) U.S. Cl. ........................... 426/98; 426/335; 426/549; 426/555; 426/654
(58) Field of Search ................... 426/94, 97, 98, 426/654, 560, 549, 555, 335

(56) References Cited

U.S. PATENT DOCUMENTS

| | | | |
|---|---|---|---|
| 1,887,175 | 11/1932 | Woxvold | 426/549 |
| 3,464,829 | 9/1969 | Geminder et al. | 426/549 |
| 3,552,977 | 1/1971 | Bouchard et al. | 99/91 |
| 3,730,732 | 5/1973 | Rubio | 99/91 |
| 3,734,748 | 5/1973 | Ueno et al. | 99/150 R |
| 3,853,998 | 12/1974 | Rubio | 426/151 |
| 3,903,295 * | 9/1975 | Palmer | 426/289 |
| 3,922,350 * | 11/1975 | Dockendorf et al. | 426/25 |
| 3,989,852 * | 11/1976 | Palmer | 426/286 |
| 4,034,125 | 7/1977 | Ziemke et al. | 426/549 |
| 4,141,998 | 2/1979 | Ziemke et al. | 426/549 |
| 4,267,198 * | 5/1981 | Sato et al. | 426/332 |
| 4,288,460 | 9/1981 | Ciliberto et al. | 426/96 |
| 4,497,845 * | 2/1985 | Percel et al. | 426/646 |
| 4,500,557 | 2/1985 | Edging | 426/549 |
| 4,537,784 | 8/1985 | Percel et al. | 426/303 |
| 4,792,456 | 12/1988 | Katz et al. | 426/551 |
| 4,931,297 | 6/1990 | Malyniak et al. | 426/549 |
| 5,173,321 * | 12/1992 | Hosogoe et al. | 426/573 |
| 5,225,226 | 7/1993 | Thomas et al. | 426/561 |
| 5,338,552 | 8/1994 | Nasu et al. | 426/19 |
| 5,562,938 | 10/1996 | Lee et al. | 426/549 |
| 5,817,356 | 10/1998 | Gum et al. | 426/325 |

OTHER PUBLICATIONS

"Encapsulated acid improves flour tortilla quality", LaBell, F, Prepared Foods, 1999 168 (10) 91. ISSN:0747–2536; Abstract Supplied Only.*

"Shelf Life of corn tortilla extended by preservatives", Hanley, R. L., Dairy, Food and Environemtal Sanditaiton (1989) 9 (10), 552–553. ISSN: 0273–2866; Abstract Supplied Only.*

* cited by examiner

Primary Examiner—Nina Bhat
(74) Attorney, Agent, or Firm—Hoffmann & Baron, LLP (57) ABSTRACT

An improved ingredient and method of provides a bread dough with an acid environment conducive to preserving a baked good prior to baking without deleteriously affecting the bread dough prior to baking.

32 Claims, 5 Drawing Sheets

ENCAPSULATED FOOD ACIDS FOR PRESERVATION OF BAKED GOODS

BACKGROUND OF THE INVENTION

The present invention relates to an ingredient and a method of providing an acid environment in baked goods. More particularly, the present invention relates to an encapsulated acid which provides an acid environment to a baked bread product without deleteriously affecting the bread dough before baking.

The preservation of certain food products entails the provision of an acidic environment to the product to provide stability against microbiological contamination. An acidic environment in foodstuffs has been found to act synergistically with an antimicrobial package of ingredients (such as, but not limited to, calcium propionate, sorbic acid, and benzoic acid) to increase shelf life. This is especially important when dealing with baked goods, which enjoy a longer shelf-life at a lower pH. Food grade acids are typically used in baking formulations to provide an acidic environment to a baked good.

Wheat flour tortillas which are produced for food service and packaged sales must be prepared to meet extended shelf life standards. The shelf life of wheat flour tortillas can be increased through the use of antimicrobial ingredients such as sorbic acid, calcium propionate, and sodium benzoate. In order to stabilize the antimicrobial properties of these ingredients, the pH should be kept in the acidic range, and it has been found that a pH of between about 6.0 and about 5.5 is a particularly desirable pH range for preserving baked goods.

The incorporation of food grade acids, however, presents problems for baked goods. When food acids are added to bread they have a negative effect on the proteins (gluten) in the bread, as well as the chemical leavening system. Gluten is a mixture of many proteins. The elasticity of gluten is influenced by pH. At a neutral pH, the proteins can be stretched and they will hold their shape. The degree to which the gluten can be stretched and still maintain its shape is defined as "extensibility." Gluten in a more neutral state will be more extensible, in that it will better hold its shape when stretched. Dough with a neutral pH is more easily deformable, can be stretched further, and more easily retains its stretched shape. Acidified gluten, on the other hand, is more elastic, less extensible, and will stretch, but it tends to return to its initial shape. As dough becomes less extensible, more energy is required to form and maintain the shape of the dough. The energy imparted can be by additional mixing, kneading and machining, increased pressure, or higher processing temperatures. Furthermore, because the dough is more likely to recoil, a finished product is usually a denser size per mass of the dough. Thus, a tortilla resulting from a more acidic dough will have a smaller height and diameter.

The addition of preservative acids to bread dough can also have a negative effect on the bread leavening, system. Chemical leavening systems usually include a food grade acid, eg., sodium acid pyrophosphate (SAPP), sodium aluminum phosphate (SALP), mono calcium phosphate (MCP), and a base, e.g., a carbonate source (generally sodium bicarbonate), which react to form carbon dioxide which is then trapped in the cell walls of the bread to leaven the mass. In most leavened products the base (sodium bicarbonate) dissolves in the dough while the acid portion does not go into solution until the dough is subjected to temperatures above 100 degrees Fahrenheit This prevents the formation of carbon dioxide until the dough cell walls are prepared to expand and trap the gas. When acid is added for preservation, however, it dissolves at the initial stages of mixing, and begins to react immediately with the dissolved sodium bicarbonate. The formation of carbon dioxide therefore occurs prematurely. During the baking stage, when leavening gases should be produced, the sodium bicarbonate is already fully reacted. This results in bread which is not fully leavened. Premature leavening leads to many undesirable physical qualities in the finished bread product.

A further negative effect which occurs as a result of the dough having acidic properties is that the capacity of the dough to hold water is decreased. Water migrates out of acidic dough and moves toward the surface. This causes the dough to become sticky, resulting in adherence to processing equipment. Moreover, breads which require molding or shaping are adversely affected by sticky dough because the desired shape will not be obtained in the raw dough. Thus, the shape of the finished bread product tends to be unpredictable and irregular. The overall effect of an acidic bread dough is to reduce the yield of product, produce an irregularly-shaped baked good, and increase costs of production.

In order to avoid some of the problems associated with prematurely acidifying bread dough, fumaric acid has been commonly used as a preservative acid because of its low solubility. The advantage of using an acid with low solubility is the delay in dissolution during mixing and baking. If a low pH is avoided during this time, the deleterious affects set forth above are reduced.

In spite of its low solubility, raw fumaric acid still dissolves prior to baking and lowers the pH of the bread dough sufficiently to reduce the dough's machinability; i.e., the dough loses extensibility and recoils after flattening and lengthening. Negative effects can be seen in the finished product. In the case of tortillas, translucent spots appear in the tortilla, and pillowing which is a separation of the skin, occurs. Furthermore, raw fumaric acid causes an increase in stickeness of tortilla dough. This results in a baked product which has poor crumb texture. Furthermore, the tortilla product is somewhat small in diameter per dough mass because of the recoiling of the dough.

In the interest of reducing solubility, artisans used large particle sizes of fumaric acid. As with any solute, the particle size is inversely proportional to its solubility, i.e., the larger the particle size-the slower the rate of dissolution. (Conversely, the smaller particle size-the quicker the rate of dissolution). In order to further reduce solubility of fumaric acid, it is also known to coat the fumaric acid with a coating which further delays the dissolution.

Even the large size particles, e.g. on the order of 300 microns, however, fail to achieve the desired time-dissolution profile for dough formation and baking. When the total of fumaric acid required is provided in large particles, more particles are required to achieve the required early post-baking pH, and this problem is exacerbated when coatings are used. The total amount of fumaric acid therefore must be increased to a level which causes unwanted pre-baking migration into the dough causing the previously discussed harmful effects.

It is also known to add food grade acids, particularly fumaric acid, into bread dough to impart a sour taste to a finished bread product. This is especially prevalent in baking sourdough bread compositions. U.S. Pat. No. 3,922,350 to Dockendorf discloses an acidified bread dough suitable for preparing sour dough bread which includes an amount of fumaric acid sufficient to lower the pH of the baked bread to between about 4 and 5. Dockendorf coats the acid with an edible material, and uses large size fumaric acid particles on the order of approximately 300 microns diameter. As in other cases previously described, Dockendorf must add a large amount of coated fumaric acid to the dough.

It is most preferred, therefore, to provide a fumaric acid particulate in bread doughs which remains undissolved prior to baking to provide a neutral pH. The food acid should then dissolve substantially completely during baking, to adjust to a stable acid pH range of between 6.0 to 5.5 within about 15 minutes of baking. This pH should remain substantially stable throughout the shelf-life of the bread or tortilla, i.e., there should be no undissolved acid which subsequently dissolves to lower the pH. This pH has been found as the optimum pH to preserve antimicrobial ingredients and increase shelf life of a baked good.

Previous attempts to coat fumaric have been unsuccessful in producing a desirous product in large part because of the large particle size of the fumaric acid used. An increased amount of fumaric acid was required to be added to the composition in order to provide its desired effect For example, raw fumaric acid was typically added to bread dough compositions at about 0.1% to about 0.7% based on flour weight. With previously coated fumaric acid particulates, it was required to add 1.0% to about 3.0% by weight of fumaric acid based on flour weight in order to achieve the satisfactory pH range.

It is therefore, an intention of the present invention to provide, among other things, an improved fumaric acid ingredient for providing an acid environment to bread dough formulations without deleteriously affecting the baked good product.

SUMMARY OF THE INVENTION

The present invention includes an ingredient and method and composition for providing bread dough an acid environment conducive to preserving antimicrobial ingredients after baking without deleteriously affecting the bread dough prior to baking. The ingredient is a monodispersed fumaric acid particulate having a mean particle size of from about 70 microns to about 140 microns which is encapsulated with a coating having a melting point within normal baking temperature. The method includes incorporating the coated monodispersed fumaric acid particulate into a bread dough. A bread dough composition prepared using the ingredient and method set forth above is also part of the present invention. Preferably, the bread dough composition is a tortilla dough composition.

The ingredient of the present invention is a coated monodispersed fumaric acid particulate having a mean particle size of from about 70 microns to about 140 microns, preferably from about 80 microns to about 130 microns, and more preferably from about 90 to about 120 microns, and most preferably the coated monodispersed fumaric acid particulate has a mean particle size of about 105 microns. The ingredient is substantially cubical and preferably has a coating melting point of above 125 degrees Fahrenheit. The coating can be from about 2 microns to about 8 microns thick, preferably from about 3 to about 7 microns thick, more preferably from about 4 to about 6 microns thick, and is most preferably about 5 microns thick. The coating is an edible material selected from the group consisting of lipid materials such as, but not limited to mono-, di- and triglycerides, waxes, and organic esters derived from animals, vegetables, minerals, and modifications. Some examples include glyceryl triestearates such as soybean oil, cottonseed oil, canola oil, carnuba wax, beeswax, bran wax, tallow, and palm kernel oil. The coating is preferably a hydrogenated vegetable oil. The ingredient is from about 10% to about 20% by weight coating, and, accordingly, is from about 80% to about 90% by weight fumaric acid particulate. Most preferably, the ingredient is formed of 15% coating and 85% fumaric acid particulate.

The bread dough composition of the present invention results in a baked product with a pH in the range of from about 5.5 to about 6.0. The ingredient should be present in the bread dough from about 0.1% to about 0.7% based on flour weight, and is preferably present in an amount of from about 0.15% to about 0.6%, and is most preferably present in the composition at about 0.25% by weight.

The monodispersed fumaric acid particulate can be encapsulated by fluid bed techniques, and an additional step of spray chilling can be incorporated into the encapsulation process.

As a result of the present invention an acid environment conducive to preserving antimicrobial ingredients after baking without deleteriously affecting the bread dough before baking is provided.

It is a further advantage to provide a tortilla dough formulation with enhanced physical properties as a result of the maintenance of a neutral pH prior to baking of the bread.

It is a further advantage of the present invention to provide a more efficient ingredient for providing the acid environment in bread dough, such ingredient providing better release rates of the acid with an optimal size of the monodispersed particulate and encapsulation. As a result of the coated particulate of the present invention, fumaric acid has a rate of release of less than about 20%, and, in many cases, a release rate of less than about 10%. "Release rate" as used herein is defined hereinbelow.

It is also an advantage of the present invention to provide a bread dough composition with a lesser amount of coated fumaric acid added to the bread dough composition, while enjoying the benefits of the fumaric acid without its negative effects.

For a better understanding of the present invention, together with other and further objects and advantages, reference is made to the following detailed description, taken in conjunction with the accompanying, examples and drawings, and the scope of the invention will be pointed out in the appended claims. The following detailed description is not intended to restrict the scope of the invention by the advantages set forth above.

DETAILED DESCRIPTION OF THE INVENTION

The present invention is a new ingredient for providing bread dough with an acid environment which enhances sustenance of antimicrobials and, consequently, increases shelf life. The ingredient is a coated monodispersed fumaric acid particulate having a mean particle size of from about 70 microns to about 140 microns. The coating has a melting point within normal baking temperature. "Monodispersed" as used herein refers to the distribution of size of a particulate. Specifically, monodispersed means that at least about 40% by weight, preferably at least about 60% by weight, and most preferably at least about 80% of the particulate has a largest diameter which is within 60% of the mean particle diameter. "Particle diameter" is the dimension which is the greatest straight line dimension in the largest plane taken through a three dimension particulate. When the particulate is a sphere, the particulate diameter is the diameter of the sphere, and when the particualte is cube-shaped the particualte diameter is a line drawn between opposing vertices, i.e, the longest solid dimension in the particulate. In a preferred embodiment, monodispersability means that at least 40% of the particulate is within 50% of the mean particulate diameter, and in a most preferred embodiment, within 40% of the mean particulate diameter.

The coated monodispersed fumaric acid particulate has a mean particle size of from about 70 microns to about 140 microns, preferably from about 85 microns to about 115 microns, and, most preferably, the coated monodispersed fumaric acid particulate has a mean particle size of about 105 microns. The size of the coated fumaric acid particulate and its size consistency are of significant importance because the surface area of a particle directly relates to its time-solubility profile. Similarly, the shape of a particle also determines the availability of surface area, and also has an influence on its solubility. Preferably, the coated monodispersed fumaric acid particulate of the present invention is substantially cubical in shape. It has been found that the inventive ingredient, when utilized at the optimal diameter ranges, has yielded dramatically unexpected results.

As mentioned above, it is known to incorporate raw (uncoated) fumaric acid to create an acid environment for preserving baked goods. It is further known to coat fumaric acid to prolong the dissolution of the acid in the dough formulation. By preventing the premature (before baking) dissolution of fumaric acid, the coating on the fumaric acid ensures a higher quality of a baked good as it prevents premature leavening and increased recoil of gluten proteins in the bread.

The coating is an edible material which remains intact prior to baking, but melts within normal baking temperatures. Preferably the coating melts at a temperature greater than 125 degrees Fahrenheit. The coating material must be compatible with other dough ingredients. Examples of such coating materials are vegetable fat, gelatin, and vegetable gums, but is preferably hydrogenated vegetable oil. Other coatings include, but are not limited to, a material selected from the group consisting of lipid materials such as, but not limited to, mono-, di, and triglycerides, waxes, and organic esters derived from animals, vegetables, minerals, and modifications. Examples include glyceryl triestearates such as soybean oil, cottonseed oil, canola oil, carnuba wax, beeswax, bran wax, tallow, and palm kernel oil.

Fumaric acid is preferably used in the present invention. While food grade acids other than fumaric have been contemplated for use, fumaric acid has been found to be the most desirable. The fumaric acid is encapsulated using methods known in the industry, such as fluid bed, modified fluid bed encapsulation, and spray chilling, with fluid bed methods being the most desirable. The coating in the present invention comprises from about 10% to about 20% by weight of the total weight of the ingredient, and preferably about 15% by weight of the total ingredient. The coating typically is from about 2 to about 8 microns thick, preferably from about 4 to about 6 microns thick, and most preferably about 6 microns thick. The coating is also preferably a substantially uniform thickness.

The coating of the fumaric acid provides a release rate which is defined as the amount of acid which dissolves in solution per unit of time. Release rates are given as percentages, and can be measured by placing a quantity of encapsulated acid in methanol for a given period of time. The solid portion of the resulting solution is then filtered out, and the solution can be titrated back to neutrality to determine how much acid has dissolved in solution. The more acid dissolved in solution, the higher the release rate, e.g., the more acid has been "released". For the purposes of an encapsulated acid in the present invention, it is desirous to have a release rate of less than 20%. If the release rate of the encapsulation is greater than 20%, the acid is insufficiently protected, and dissolution of the acid will reduce the pH of the dough too much prior to baking. As mentioned above, the size and shape of the particulate have a significant impact on the release rate. The ingredient of the present invention has a release rate less than 20%, and most preferably has a release rate of less than about 10%.

As mentioned above, a preferred embodiment of the present invention is to use the claimed ingredient of the present invention in a tortilla dough. "Bread dough" as used herein refers to any baked good where some type of flour is a component of the dough. In a preferred embodiment of the present invention, the claimed ingredient is used in tortilla dough formulations including wheat flour.

EXAMPLES

The following are examples of compositions prepared using the inventive ingredient in tortilla doughs which are compositions also considered part of the invention. The examples are also compared to tortilla doughs prepared using other food acids, and the accompany Figures serve to demonstrate the improved results of the present invention. The examples are not meant to limit the scope of the invention, as defined by the claims.

Example 1

A wheat flour tortilla was prepared using the following specifications. First the components were mixed together in a dough. 1000 grams of wheat flour was combined with 505 grams of water, 70 grams of shortening, 5 grams of emulsifiers, 15 grams of baking powder, 15 grams of salt, 1.28 grams of encapsulated fumaric acid, 4 grams of potassium sorbate, 5 grams of calcium propionate, and 0.02 grams of L-cysteine monohydrochloride. All dry ingredients and shortening were mixed prior to the addition of water. Mixing was conducted in a Hobart mixer for 3 minutes at slow speed and 4 minutes at high speed. The dough was then formed into dough balls by a divider/rounder and allowed to sit for 20 minutes. The dough balls were then arranged on a platen and pressed in a hot press. Pressed tortillas were then passed through an oven, and subsequently cooled.

The components and their quantity by weight are shown in the following table:

TABLE 1

| Component | Weight (grams) |
|---|---|
| Wheat flour | 1,000 |
| Water | 505 |
| Shortening | 70 |
| Emulsifiers | 5 |
| Baking powder | 15 |
| Salt | 15 |
| Encapsulated fumaric acid | 1.28 |
| Potassium sorbate | 4 |
| Calcium propionate | 5 |
| L-cysteine monohydrochloride | 0.02 |

Figure 1:
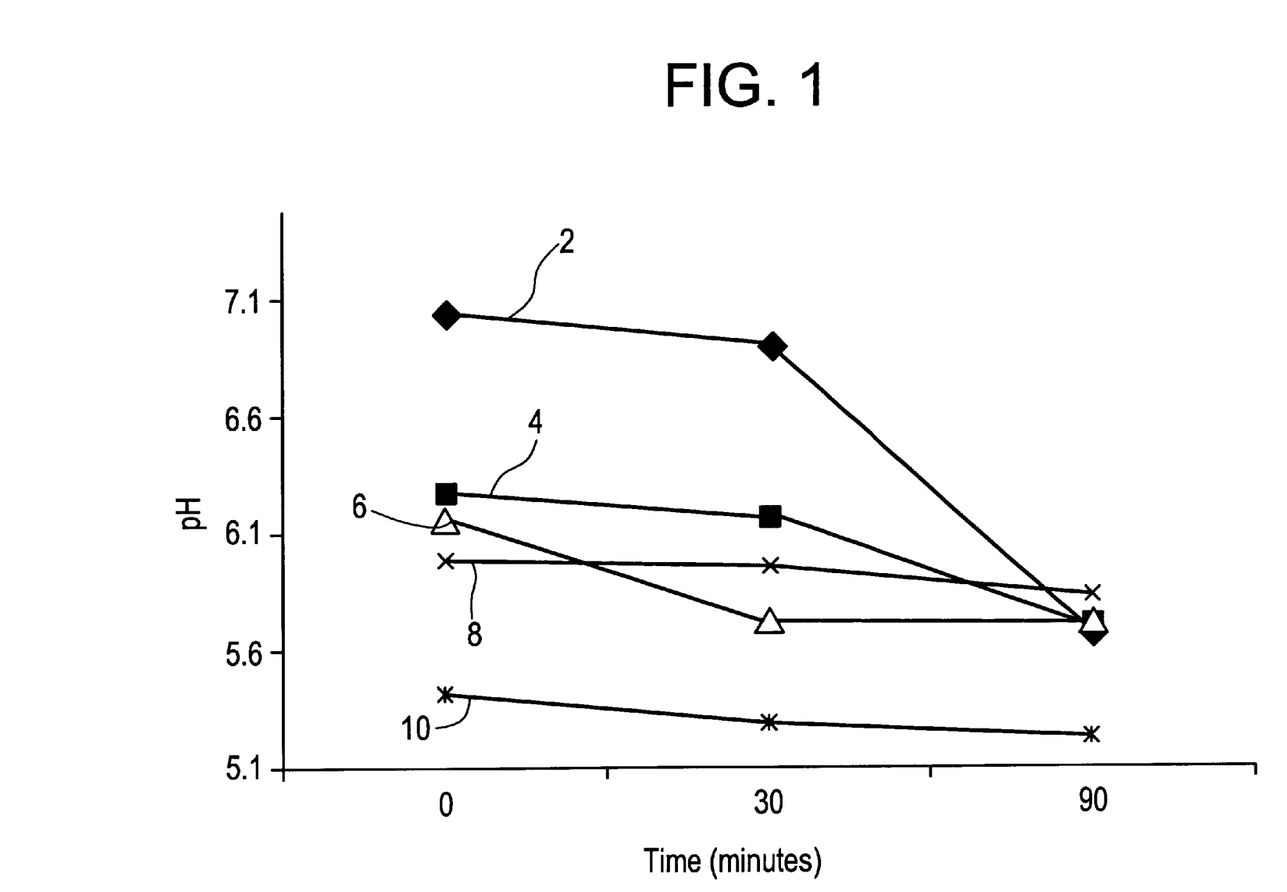
FIG. 1 is a graphic representation of the results of a comparative test comparing the acid dissolution of the ingredient of the present invention with other acid particualtes.

With reference now to FIG. 1 of the drawings, several types of fumaric acid particulates were added to bread doughs, and the pH of the doughs were graphed as a function of time. The pH is shown as the y-axis, and time is shown as the x-axis, with zero (0) representing the time at which mixing of the dough has started. The pH of the doughs is indicative of the dissolution of the acid, i.e., the lower the pH, the more acid has been dissolved into the dough. The five lines shown represent five doughs which are substantially similar with the exception of a different fumaric acid particulate included in each dough. Line 2, plotted with diamond-shaped coordinates, represents a tortilla dough made with the ingredient of the present invention. Line 4, plotted with square-shaped coordinates, represents a tortilla dough made with a fine uncoated fumaric acid particle size (mean particle size is 50 microns). Line 6, plotted with triangular-shaped coordinates, represents a tortilla dough made with a large size (mean particle size 300 microns) uncoated fumaric acid particulates. Line 8, plotted with X-shaped coordinates, represents a tortilla dough made with large size (mean particle size 300 microns) encapsulated fumaric acid particulates. Line 10, plotted with asterisk (*) shaped coordinates, represents a tortilla dough made with a fine (man particle size 50 microns) coated fumaric acid particulate.

The time shown on the X-axis corresponds to the stages of preparation for the tortilla. First the ingredients are mixed together to make the dough starting at 0 minutes. The dough is then shaped in a divider and a rounder. The machined dough is then pressed between hot plates at approximately 30 minutes. The dough is then balked. As is evident from FIG. 1, the pH resulting from the ingredient of the present invention drops remarkably from a high, relatively non-acidic level before baking to the desired range during the period from press time (at 30 minutes) to the end of baking (90 minutes.

As evidenced by FIG. 1, the tortilla dough with the ingredient of the present invention, line 2, yields a very desirous acid dissolution profile. It is the only tortilla dough which remains nearly neutral at 30 minutes, which is particularly important, as the tortilla is pressed into shape at this time. As previously mentioned, it is important for the dough to remain neutral at this time so that the pressed tortilla does not retract to a smaller shape.

Figure 2:
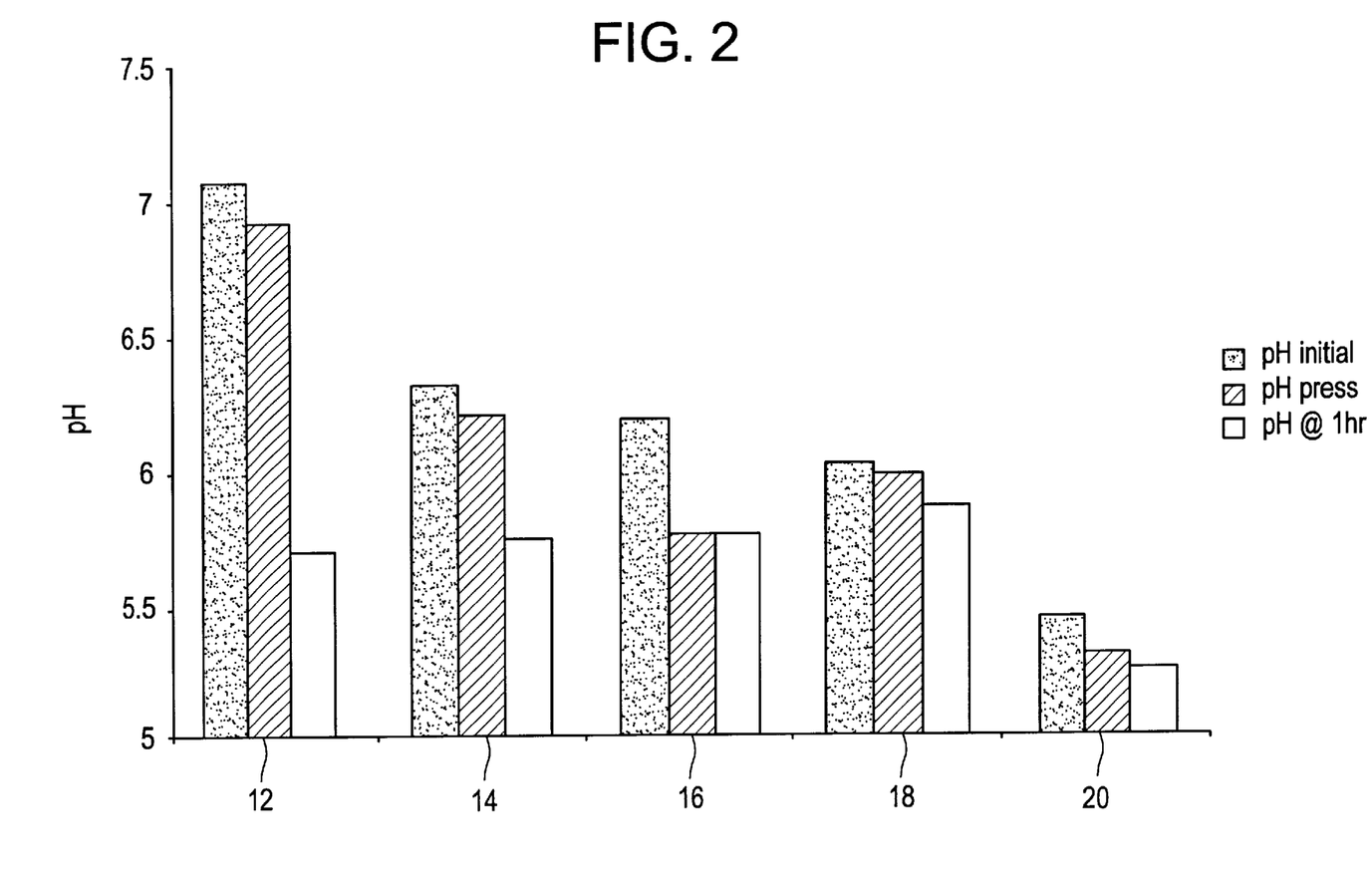
FIG. 2 is a bar graph illustrating maintenance of neutral pH and preservation of fumaric acid from dissolution prior to baking.

Referring now to FIG. 2 of the drawings, the same tortilla doughs of FIG. 1 are shown as a bar graph in FIG. 2, with the pH taken at the indicated times. The pH of each dough was taken at 3 different times, each represented by adjacent bars grouped together on the graph. Moving from left to right, group 12 represents a tortilla dough of line 2 from FIG. 1 (tortilla dough with the ingredient of the present invention). Group 14 is the equivalent of line 4 of FIG. 1, group 16 is equivalent of line 6 of FIG. 1, 18 is the equivalent of 8, and 20 is the equivalent of 10.

Referring more particularly to group 12 of FIG. 2, the first bar (moving from left to right) represents the initial pH of the tortilla dough, the middle bar represents the pH of the dough at press (approximately 30 minutes), and the last bar represents the pH of the dough after an hour of baking. As evident from FIG. 2, the dough 12 utilizing the ingredient of the present invention is the only dough with a high pH prior to baking. As previously mentioned, this ability to maintain a neutral pH favorably impacts the physical properties of the resulting tortilla.

Figure 3:
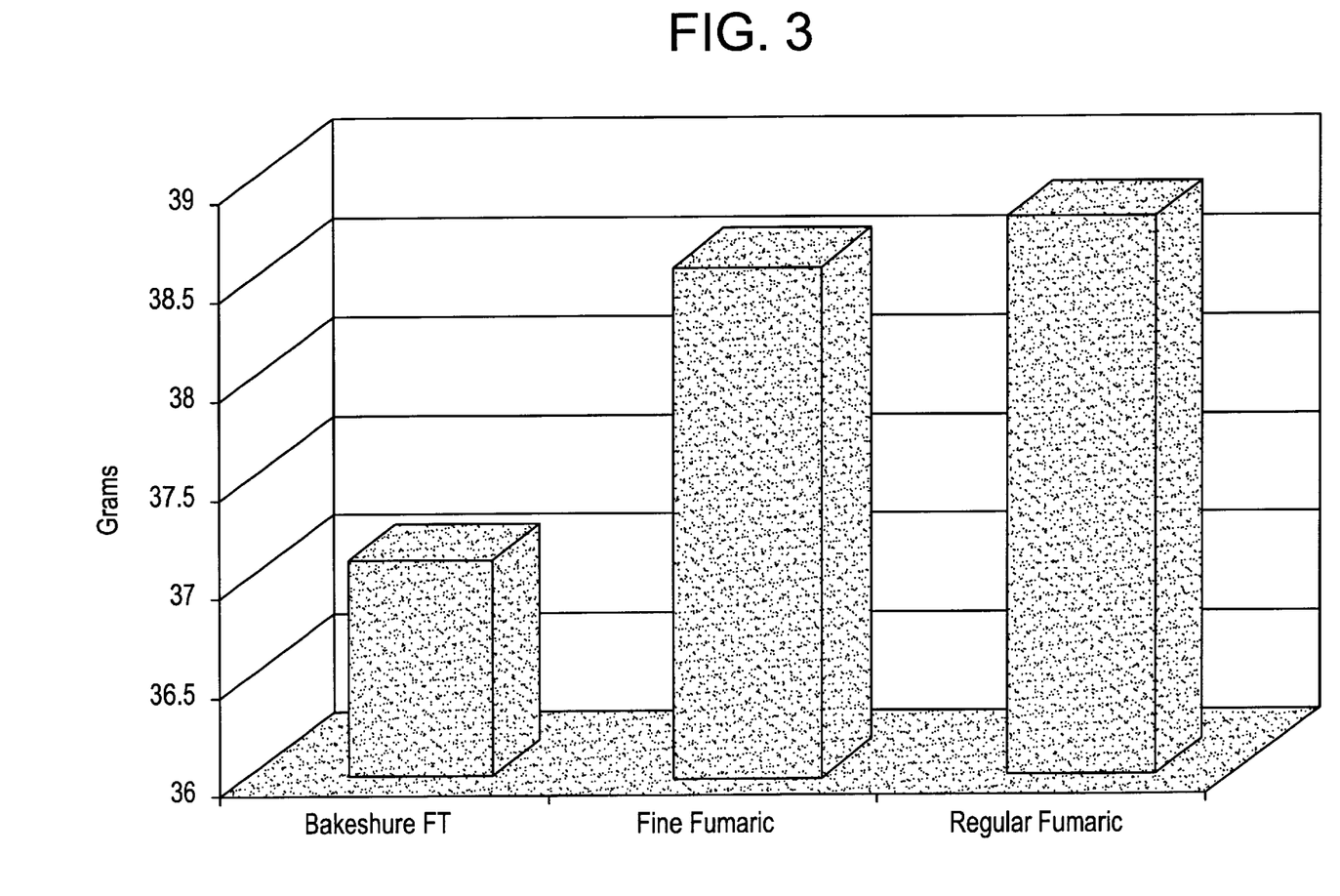
FIG. 3 is a bar graph which demonstrates dramatic lightness (reduction of weight) of tortillas prepared using the claimed ingredient as compared to tortillas prepared using non-inventive fumaric acid ingredients.
Figure 4:
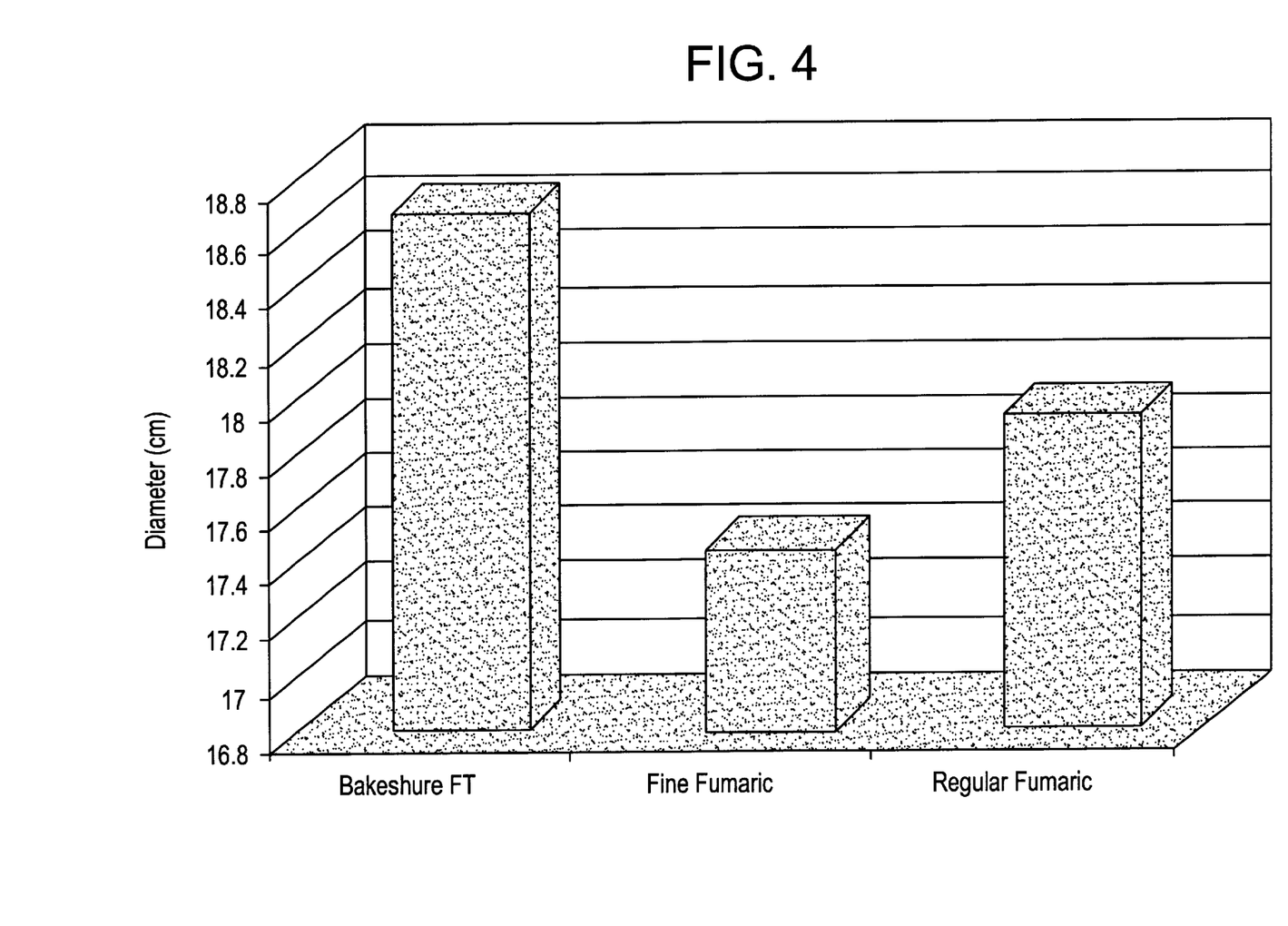
FIG. 4 is a bar graph which depicts a dramatic increase in the diameter of tortillas prepared using the invention as compared to tortillas prepared using other non-inventive fumaric acid ingredients.
Figure 5:
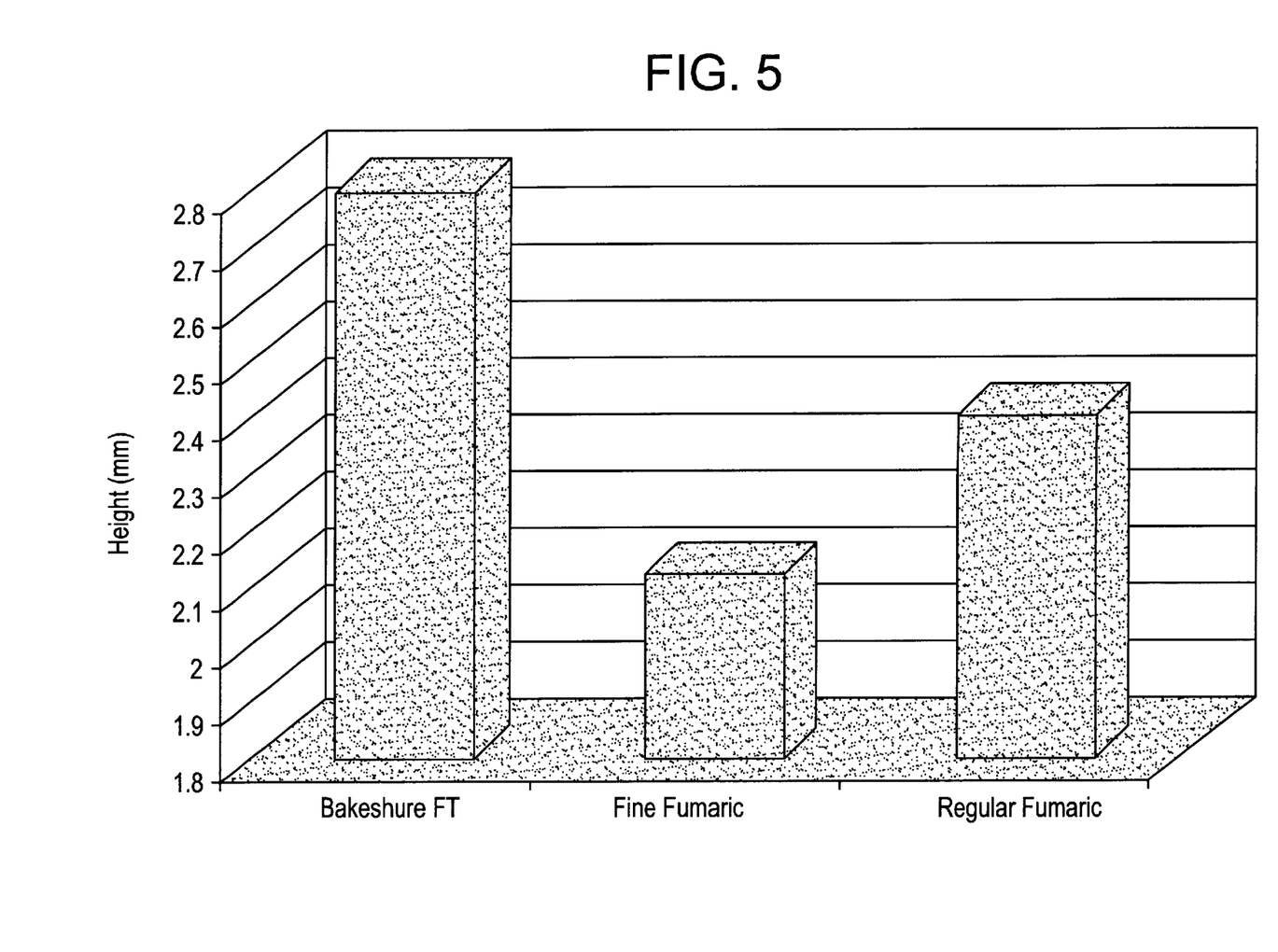
FIG. 5 is a bar graph which also dramatically demonstrates an increased thickness of tortillas prepared using the claimed ingredient as compared to tortillas prepared using non-inventive fumaric acid ingredients.

Referring now to FIGS. 3 through 5 of the drawings, tortillas were prepared using the ingredient of the present invention, and using other preservative acids previously practiced. FIG. 3 is a measurement of the mass of the tortillas in grams. In all of FIGS. 3 through 5 Bakeshure FT represents the tortilla made using the ingredient of the present invention. Fine fumaric represents a tortilla made with a smaller size fumaric acid particulate, and the regular fumaric represents a tortilla made using a larger size fumaric acid particulate. FIG. 4 shows the diameter of the tortillas, and FIG. 5 shows the thickness of the tortillas. As is evident from the Figures, the tortillas prepared using the ingredient of the present demonstrated superior physical qualities to that of prior art.

The tortillas prepared using the ingredient of the present invention are lighter, i.e., weigh less than the other tortillas, as shown in FIG. 3. The tortilla weighed approximately 37 grams, as compared to prior art tortillas, which weighed 38.5 grams, and about 38.6 grams respectively. Furthermore, the same tortilla which weighed less than the others in FIG. 3, had a greater diameter as demonstrated by the bar graph in FIG. 4, and was thicker as demonstrated by the bar graph in FIG. 5.

FIG. 4 is a graph showing the tortilla prepared using the ingredient of the present invention as Bakesure FT bar near the left y-axis, with a diameter of about 18.5 centimeters, whereas the comparative prior art tortillas were measured as having a diameter of about 17.4, and 17.8, respectively. FIG. 5 is a graph showing the tortilla prepared using the ingredient of the present invention on the left side near the y-axis as having a thickness of about 2.75 millimeters, as compared to the other prior art tortillas, having a thickness of about 2.1 millimeters, and about 2.3 millimeters respectively. The size disparity, especially when considered in view of the fact that less tortilla dough (as evidenced by FIG. 3 mass comparisons), indicates superior tortilla quality achieved using the ingredient of the present invention. The improved physical quality of the tortilla is a direct result of the higher pH of the dough prior to baking, as evidenced by the graph of FIG. 2, showing the maintenance of neutrality of the ingredient of the present invention as compared to prior art.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

What is claimed is:

1. An ingredient for providing bread dough an acid environment conducive to preserving antimicrobial ingredients after baking without deleteriously affecting the bread dough prior to baking comprising:

a monodispersed fumaric acid particulate having a mean particle size of from about 70 microns to about 140 microns and encapsulated with a coating having a melting point within normal baking temperature.

2. An ingredient according to claim 1 wherein said monodispersed fumaric acid particulate has a mean particle size of from about 85 microns to about 115 microns.

3. An ingredient according to claim 2 wherein said monodispersed fumaric acid particulate has a mean particle size of about 105 microns.

4. An ingredient according to claim 1 wherein said coating has a melting point temperature of above about 125 degrees Fahrenheit.

5. An ingredient according to claim 1 wherein said coating is an edible material selected from the group consisting of lipids, monoglycerides, diglycerides, triglycerides, waxes, organic esters, and combinations thereof.

6. An ingredient according to claim 5 wherein said coating is hydrogenated vegetable oil.

7. An ingredient according to claim 1 wherein said coating comprises from about 10% to about 20% of said ingredient by weight.

8. An ingredient according to claim 7 wherein said coating is about 15% of said ingredient by weight.

9. An ingredient according to claim 1 wherein said coating has a rate of release of said fumaric acid particulate of less than about 20%.

10. An ingredient according to claim 1 wherein said coating has a rate of release of said fumaric acid particulate of less than about 10%.

11. An ingredient according to claim 1 wherein said ingredient is cubical.

12. An ingredient according to claim 1 wherein said coating is about 2 to about 8 microns thick.

13. An ingredient according to claim 12 wherein said coating is about 4 to about 6 microns thick.

14. An ingredient according to claim 13 wherein said coating is about 5 microns thick.

15. A bread dough composition which imparts an acid environment to a baked product derived from said dough, comprising wheat, water, shortening, emulsifiers, baking powder, salt, potassium sorbate, calcium propionate, L-cysteine monohydrochloride, and a monodispersed fumaric acid particulate having a mean particle size of from about 70 microns to about 140 microns, and coated with a coating having a melting point within normal baking temperature of bread.

16. A bread dough composition according to claim 15 wherein said bread dough is a tortilla dough.

17. A bread dough composition according to claim 15 wherein said acidic environment corresponds to a pH of from about 5.5 to about 6.0.

18. A bread dough composition according to claim 15 wherein said monodispersed fumaric acid particulate is present in said bread dough from about 0.1% to about 0.7% by weight.

19. A bread dough composition according to claim 17 wherein said monodispersed fumaric acid particulate is present in said bread dough at about 0.25% by weight.

20. A method of preparing bread dough to provide an acid environment after baking without deleteriously affecting said bread dough prior to baking comprising:
incorporating an encapsulated monodispersed fumaric acid particulate having
i) a mean particle size of from about 70 microns to about 140 microns; and
ii) a coating having a melting point within normal baking temperature of a bread into the bread dough.

21. A method according to claim 20 wherein said monodispersed fumaric acid particulate is encapsulated by fluid bed technique.

22. A method according to claim 20 where said monodispersed fumaric acid particulate is encapsulated by a fluid bed technique and an additional step of spray chilling.

23. A method according to claim 20 wherein said monodispersed fumaric acid particulate has a mean particle size of from about 85 microns to about 115 microns.

24. A method according to claim 23 wherein said monodispersed fumaric acid particulate has a mean particle size of about 105 microns.

25. A method according to claim 20 wherein said acid environment corresponds to a pH of from about 5.5 to about 6.0.

26. A method according to claim 20 wherein said monodispersed fumaric acid particulate is present in said bread dough from about 0.1% to about 0.7% by weight.

27. A method according to claim 20 wherein said melting point of said coating is greater than about 125 degrees Fahrenheit.

28. A method according to claim 20 wherein said coating is an edible material selected from the group consisting of lipid materials, monoglycerides, diglycerides, triglycerides, waxes and organic esters.

29. A method according to claim 28 wherein said coating is hydrogenated vegetable oil.

30. A method according to claim 20 wherein said bread dough is a tortilla dough composition.

31. A method according to claim 20 wherein said coating has a rate of release of said fumaric acid particulate of less than about 20%.

32. A method according to claim 31 wherein said coating has a rate of release of said fumaric acid coating of less than about 10%.

* * * * *

UNITED STATES PATENT AND TRADEMARK OFFICE
CERTIFICATE OF CORRECTION

| | |
|---|---|
| PATENT NO. | : 6,312,741 B1 |
| DATED | : November 6, 2001 |
| INVENTOR(S) | : Luis Navarro |

It is certified that error appears in the above-identified patent and that said Letters Patent is hereby corrected as shown below:

Column 7,
Line 47, now reads "The dough is then balked" should read -- The dough is then baked --

Signed and Sealed this

Twenty-third Day of April, 2002

Attest:

*Attesting Officer*

JAMES E. ROGAN
*Director of the United States Patent and Trademark Office*